(12) United States Patent
Nakagawa (10) Patent No.: US 9,133,878 B2
(45) Date of Patent: Sep. 15, 2015

(54) SEAL MECHANISM OF LINEAR GUIDE APPARATUS

(75) Inventor: Takumi Nakagawa, Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 14/357,643

(22) PCT Filed: Aug. 10, 2012

(86) PCT No.: PCT/JP2012/005097
§ 371 (c)(1),
(2), (4) Date: Jul. 14, 2014

(87) PCT Pub. No.: WO2013/073079
PCT Pub. Date: May 23, 2013

(65) Prior Publication Data
US 2015/0043841 A1  Feb. 12, 2015

(30) Foreign Application Priority Data
Nov. 16, 2011  (JP) ................................ 2011-250818

(51) Int. Cl.
*F16C 29/08* (2006.01)
*F16C 29/00* (2006.01)
*F16C 33/76* (2006.01)
*F16C 29/06* (2006.01)

(52) U.S. Cl.
CPC ............ *F16C 29/088* (2013.01); *F16C 29/005* (2013.01); *F16C 29/063* (2013.01); *F16C 29/08* (2013.01); *F16C 29/065* (2013.01); *F16C 33/76* (2013.01)

(58) Field of Classification Search
CPC .... F16C 29/063; F16C 29/005; F16C 29/065; F16C 29/08; F16C 29/086; F16C 29/088; F16C 33/76
See application file for complete search history.

(56) References Cited

U.S. PATENT DOCUMENTS

| 5,149,205 A | 9/1992 | Tsukada | |
|---|---|---|---|
| 5,374,127 A * | 12/1994 | Agari | 384/15 |
| 6,902,322 B2 * | 6/2005 | Matsumoto | 384/15 |
| 7,819,584 B2 * | 10/2010 | Michioka et al. | 384/15 |

(Continued)

FOREIGN PATENT DOCUMENTS

| DE | 19841668 A1 * | 3/2000 | F16C 29/06 |
|---|---|---|---|
| JP | 2003-254329 A | 9/2003 | |

(Continued)

OTHER PUBLICATIONS

International Search Report dated Nov. 20, 2012 with English translation (three (3) pages).

(Continued)

*Primary Examiner* — Alan B Waits
(74) *Attorney, Agent, or Firm* — Crowell & Moring LLP (57) ABSTRACT

To improve sealability of end portions of under seal in a linear guide apparatus. A seal mechanism of the linear guide apparatus includes under seals and side seals to provide seals between a guide rail and a slider. Auxiliary lip is attached on an inner surface of an end cap and in sliding contact with the guide rail. The auxiliary lip is bent in its middle and covers the end portion of the under seal from two directions. The auxiliary lip includes an axial direction lip and an intersecting direction lip integrally formed with the axial direction lip and continuously extending from an end portion of the axial direction lip.

2 Claims, 6 Drawing Sheets

(56) References Cited

U.S. PATENT DOCUMENTS

| | | | |
|---|---|---|---|
| 7,950,852 B2* | 5/2011 | Kondo | 384/15 |
| 8,596,868 B2* | 12/2013 | Furusawa et al. | 384/15 |
| 2014/0301677 A1* | 10/2014 | Furusawa et al. | 384/15 |
| 2015/0110426 A1* | 4/2015 | Matsumoto et al. | 384/15 |

FOREIGN PATENT DOCUMENTS

| | | | | |
|---|---|---|---|---|
| JP | 2010-156381 A | 7/2010 | | |
| WO | WO 04001245 A1 * | 12/2003 | | F16C 29/06 |

OTHER PUBLICATIONS

Japanese-language Written Opinion (PCT/ISA/237) dated Nov. 20, 2012 (three (3) pages).

International Preliminary Report on Patentability (PCT/IB/338) and (PCT/IB/373) dated Jun. 19, 2014, including Written Opinion (PCT/ISA/237) (five (5) pages).

Taiwanese Office Action dated Apr. 1, 2015, with partial English translation (six (6) pages).

* cited by examiner

SEAL MECHANISM OF LINEAR GUIDE APPARATUS

TECHNICAL FIELD

The present invention relates to a seal mechanism of a linear guide apparatus.

BACKGROUND ART

A seal mechanism in a linear guide apparatus is a mechanism to provide a seal between a guide rail, and a slider main body and end caps straddling on the guide rail, so as to prevent leakage of an internal lubricant and to prevent entering of external dust. For such purposes, various means have been conventionally employed, and PTL 1 discloses one of such means. Under seals (side surface seals 800 recited in PTL 1) extending in an axial direction are attached to both arm portions of a slider main body and end caps straddling on a guide rail. In this example, the under seals are attached in such a way that each of the under seals is fitted into a retainer, and the retainer is attached to the slider main body and the end caps. Thus, an end surface of the retainer is flush with an end surface of the under seal. Although not illustrated, as recited in PTL 1 at paragraph 0023, a side seal is closely fitted to the end surface of the retainer without gaps, and thus the end surface of the under seal and the side seal are closely fitted to each other. In this manner, a seal is provided between the guide rail, and the slider main body and the end caps straddling on the guide rail.

CITATION LIST

Patent Literature

PTL 1: JP 2010-156381 A.

SUMMARY OF INVENTION

Technical Problem

However, even when the seal between the guide rail, and the slider main body and the end caps straddling on the guide rail is provided by the under seals and the side seals in contact with the under seals, a problem of lubricant leakage occurs. The reason is that there are cases in which gaps are formed in contact points between the end portion of the under seal and the side seal due to, for example, a lack of precision of seal parts, and displacement of the seal caused by relative movement of the slider and the guide rail. Therefore, it is an object of the present invention to improve sealability of the end portions of the under seals.

Solution to Problem

According to an aspect of the present invention, there is provided a seal mechanism of a linear guide apparatus, the linear guide apparatus including: a guide rail including a rail-side rolling element rolling groove extending in an axial direction on each of both side surfaces of the guide rail; a slider main body straddling on the guide rail to be capable of moving relatively, the slider main body including first arm portions at positions facing the both side surfaces of the guide rail, the first arm portions being integrally continuous through a first back portion facing another surface of the guide rail, each of the first arm portions including a slider-side rolling element rolling groove facing the rail-side rolling element rolling groove and an internal linear rolling element returning passage; end caps coupled to both end surfaces of the slider main body in the axial direction, respectively, each of the end caps including second arm portions at positions facing the both side surfaces of the guide rail, the second arm portions being integrally continuous through a second back portion facing the another surface of the guide rail, each of the second arm portions including an arcuate direction changing passage communicating a linear load rolling passage with the rolling element returning passage, the load rolling passage being formed by the rail-side rolling element rolling groove and the slider-side rolling element rolling groove facing each other; and a plurality of rolling elements rollably loaded in a rolling element rolling passage formed by the load rolling passage, the rolling element returning passage, and the direction changing passage. The seal mechanism includes: side seals coupled to axially outer end surfaces of the end caps, respectively, each of the side seals including: third arm portions at positions facing the both side surfaces of the guide rail, the third arm portions being integrally continuous through a third back portion facing the another surface of the guide rail; and a lip portion on surfaces, of the third back portion and the third arm portions, facing toward the guide rail, the lip portion being in sliding contact with the guide rail; and under seals extending in the axial direction, each of the under seals being attached on surfaces, of the first arm portions and the second arm portions, facing toward the guide rail, the under seals being disposed on a farther side from the first back portion and the second back portion than the slider-side rolling element rolling groove and the direction changing passages. The under seals and the side seals seal an inside from an outside. Each of the end caps includes an auxiliary lip in sliding contact with the guide rail and bent in a middle of the auxiliary lip so as to cover an end portion of the under seal between the end cap and the guide rail from two directions including from the side seal side and from a far side from the second back portion. The auxiliary lip includes: an axial direction lip on a surface, of the second arm portion, facing toward the guide rail, the axial direction lip being disposed on a farther side from the second back portion than the under seal to extend along the under seal; and an intersecting direction lip integrally formed with the axial direction lip so as to connect an end portion on the side seal side of the axial direction lip, the intersecting direction lip continuously extending in a direction intersecting the axial direction along an edge of the surface, of the second arm portion, facing the guide rail, the edge being close to the side seal, the intersecting direction lip being in contact with the end portion of the under seal.

Preferably, a recessed portion may be formed on a side surface of the intersecting direction lip of the auxiliary lip, and the end portion of the under seal may be fitted in the recessed portion.

Advantageous Effects of Invention

In the aspect of the present invention, the auxiliary lip bent in its middle in the longitudinal direction covers the end portion of the under seal between the end cap and the guide rail from the two directions including from the open end side of the second arm portion of the end cap (a far side from the second back portion) and from the side of the side seal. Since the intersecting direction lip of the auxiliary lip is in contact with the end portion of the under seal, the seal is first provided between the end portion of the under seal and the intersecting direction lip. Even when a leakage occurs here, the axial direction lip of the auxiliary lip seals the leakage on the far side of the end cap from the second back portion, and the intersecting direction lip seals the leakage on the side seal side. Further, the axial direction lip and the intersecting direction lip make the route of the leakage to the outside narrow and bent and increase the distance of the route, so that the labyrinth effect advantageously improves the sealing performance. In particular, when the recessed portion is formed in the side surface of the intersecting direction lip, and the end portion of the under seal is fitted in this recessed portion, the sealability between the intersecting direction lip and the under seal is improved. Also, even when a leakage occurs here, a further labyrinth effect is obtained from the recessed/protruding fitted portions.

DESCRIPTION OF EMBODIMENTS

Figure 1:
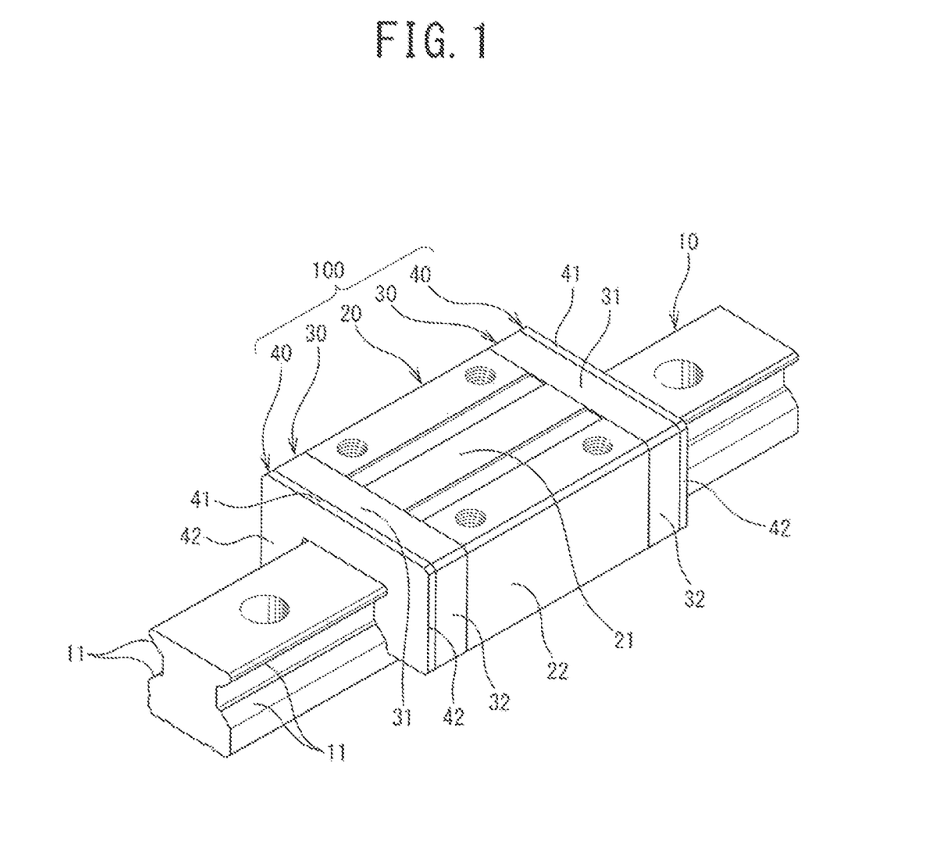
FIG. 1 is a perspective view of an entirety of an embodiment of the present invention.
Figure 2:
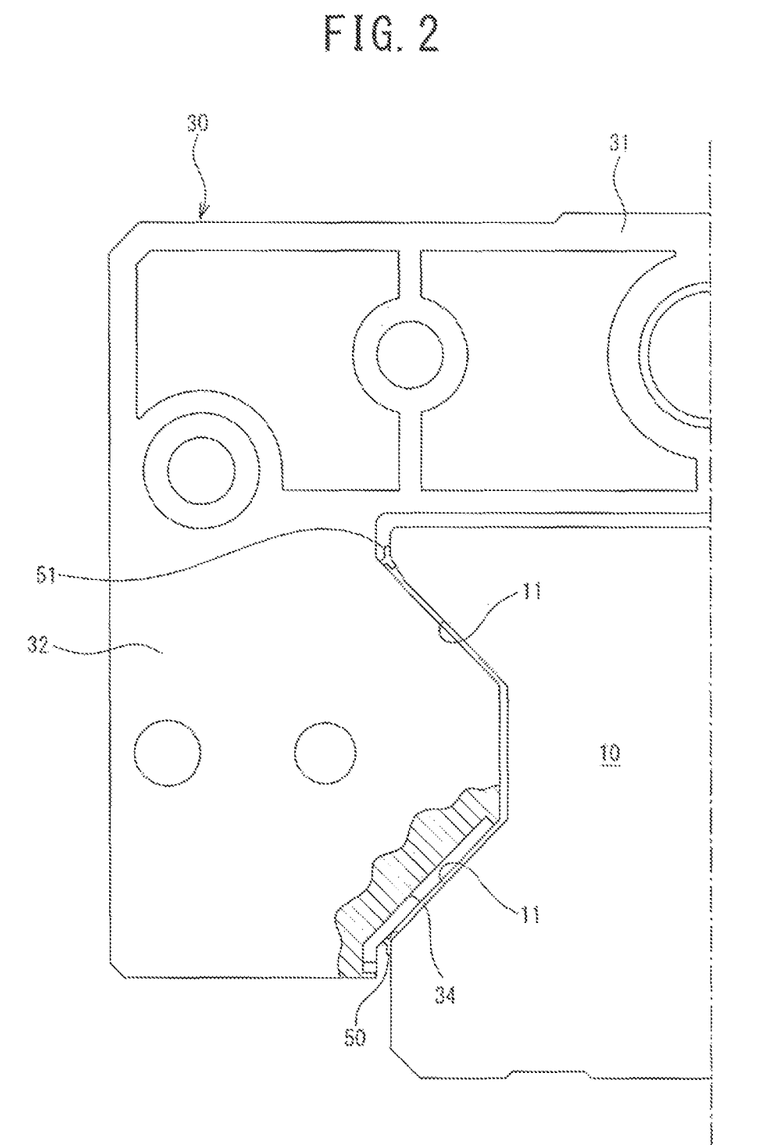
FIG. 2 is an enlarged front view illustrating a groove in which an auxiliary lip is fitted.

FIG. 1 is a perspective view of an example of a linear guide apparatus including a guide rail 10 illustrated with a reduced length, a slider main body 20, end caps 30, and side seals 40. In the drawing, an illustration of screws to fix the end caps 30 and the side seals 40 to the slider main body 20 is omitted.

There exist a number of examples of the linear guide apparatus in which, as illustrated in FIG. 1, the guide rail 10 extends horizontally in an axial direction and a lateral direction, and a slider 100 including the slider main body 20, the end caps 30, and the side seals 40 straddles on the top surface of the guide rail 10. Consequently, also in this embodiment, orientation of the axial direction (a longitudinal direction of the guide rail 10), a vertical direction, and the lateral direction will be described in accordance with such an example. Therefore, in the case where the axial direction, the vertical direction, and the lateral direction of the guide rail 10 are changed, for example, to be inclined, a direction and an inclination of each part will be construed based on this posture.

The guide rail 10 includes two upper and lower rail-side rolling element rolling grooves 11 extending in the axial direction that are formed in either of the left and right side surfaces of the guide rail 10.

The slider main body 20 includes left and right first arm portions 22, 22 at positions facing both the left and right side surfaces of the guide rail 10. These first arm portions 22, 22 are integrally continuous through a first back portion 21 facing the top surface of the guide rail 10. Each of the first arm portions 22, 22 includes slider-side rolling element rolling grooves, not illustrated, and linear rolling element returning passages inside of the first arm portion 22. This slider main body 20 straddles on the top surface of the guide rail 10 to be capable of moving relatively. The rail-side rolling element rolling grooves 11 of the guide rail 10 and the slider-side rolling element rolling grooves of the slider main body 20 facing each other form linear load rolling passages between the guide rail 10 and the slider main body 20.

Similarly to the slider main body 20, the end caps 30 also straddle on the top surface of the guide rail 10. The end cap 30 includes left and right second arm portions 32, 32 at positions facing both the left and right side surfaces of the guide rail 10. These second arm portions 32, 32 are integrally continuous through a second back portion 31 facing the top surface of the guide rail 10. There are two such end caps 30, which are coupled to both end surfaces of the slider main body 20 in the axial direction, respectively. The end caps 30 include arcuate direction changing passages 33, 33 (FIG. 5) formed in the surface of each of the second arm portions 32, 32, facing toward the guide rail 10, so as to communicate the linear load rolling passages between the guide rail 10 and the slider main body 20 with the rolling element returning passages inside the slider main body 20.

Figure 5:
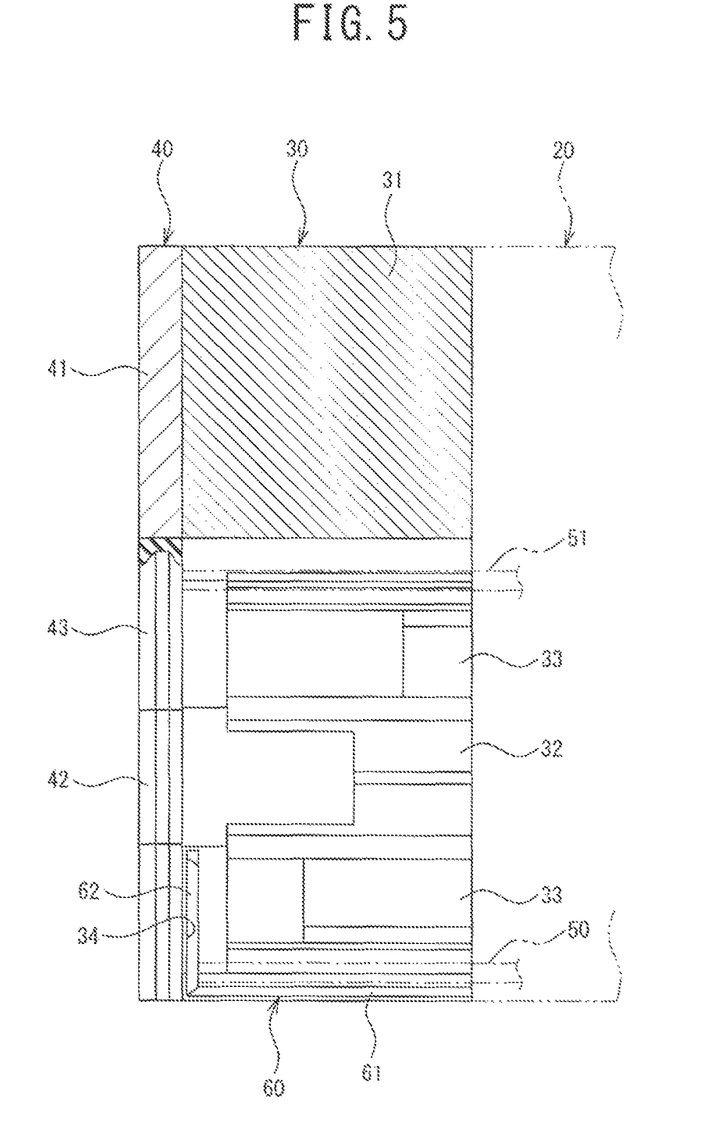
FIG. 5 is a cross-sectional view of an end cap and a side seal, illustrating inner side surfaces of arm portions of the end cap and the side seal in the state of FIG. 4.

Further, rolling element rolling passages, not illustrated, are formed by the load rolling passages and the rolling element returning passages, both not illustrated, and by the direction changing passages 33, 33 illustrated in FIG. 5. A number of rolling elements, not illustrated, are rollably loaded in the rolling element rolling passages. In this embodiment, rollers are employed as the rolling elements. However, balls may be also employed.

Similarly to the slider main body 20 and the end caps 30, the side seals 40 also straddle on the top surface of the guide rail 10. The side seal 40 includes left and right third arm portions 42, 42 at positions facing both the left and right side surfaces of the guide rail 10. These third arm portions 42, 42 are integrally continuous through a third back portion 41 facing the top surface of the guide rail 10. There are also two such side seals 40, which are coupled to axially outer end surfaces of the two end caps 30, respectively. The side seal 40 includes a lip portion 43 (FIG. 5) on the inner surfaces of the third back portion 41 and the third arm portions 42, 42, that is, the surfaces facing the guide rail 10, the lip portion 43 being in sliding contact with the guide rail 10.

An under seal 50 and an inner seal 51 are attached on the surfaces, of the first arm portion 22 and the second arm portions 32, facing toward the guide rail 10. The under seal 50 is attached at a position lower than the rolling element rolling groove and the direction changing passage 33 (corresponding to "on a farther side from the first back portion 21 and the second back portion 31" recited in claim 1), and extends in the axial direction. Rolling element retainers, not illustrated, are fixed on the surfaces of the slider-side rolling element rolling grooves and the direction changing passages 33 that are continuously formed from the first arm portion 22 to the second arm portions 32. The rolling element retainers extend along the slider-side rolling element rolling grooves and the direction changing passages. As recited in, for example, PTL 1, the under seal 50 and the inner seal 51 are supported in grooves of the retainers, with base portions of the seals being fitted in the grooves. Note that the inner seal 51 is not necessarily provided in some condition of use of the linear guide apparatus. In this embodiment, however, an end portion of the inner seal 51 is in contact with the lip portion 43 of the side seal 40, thus sealing the inside from the outside. At least one of the under seal 50 and the inner seal 51 may be directly attached on both the arm portions 22, 32, not through the rolling element retainers.

Auxiliary lips 60 (FIGS. 3A to 3C) are attached on the end cap 30. An entire longitudinal portion of this auxiliary lip 60 is in sliding contact with the guide rail 10. The auxiliary lip 60 is bent in its middle, and covers an end portion of the under seal 50 between the end cap 30 and the guide rail 10 from two directions.

Figure 3A:
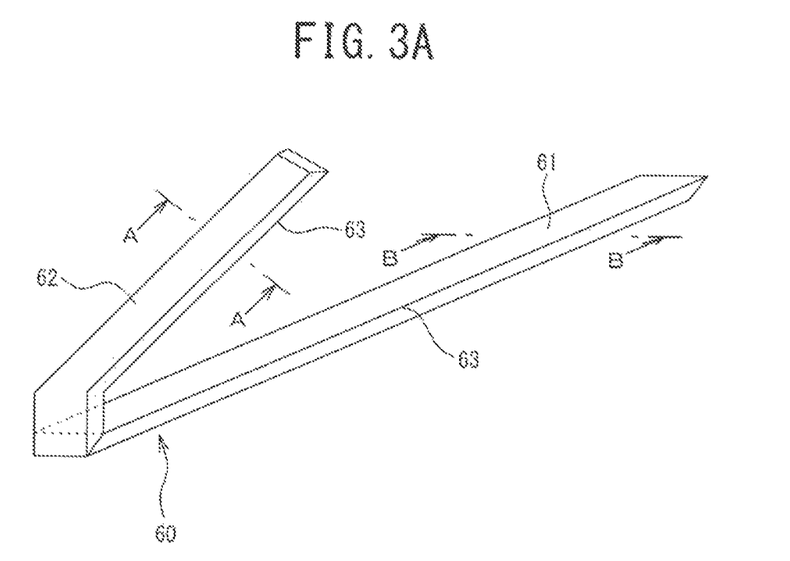
FIG. 3A is a perspective view illustrating the auxiliary lip.
Figure 4:
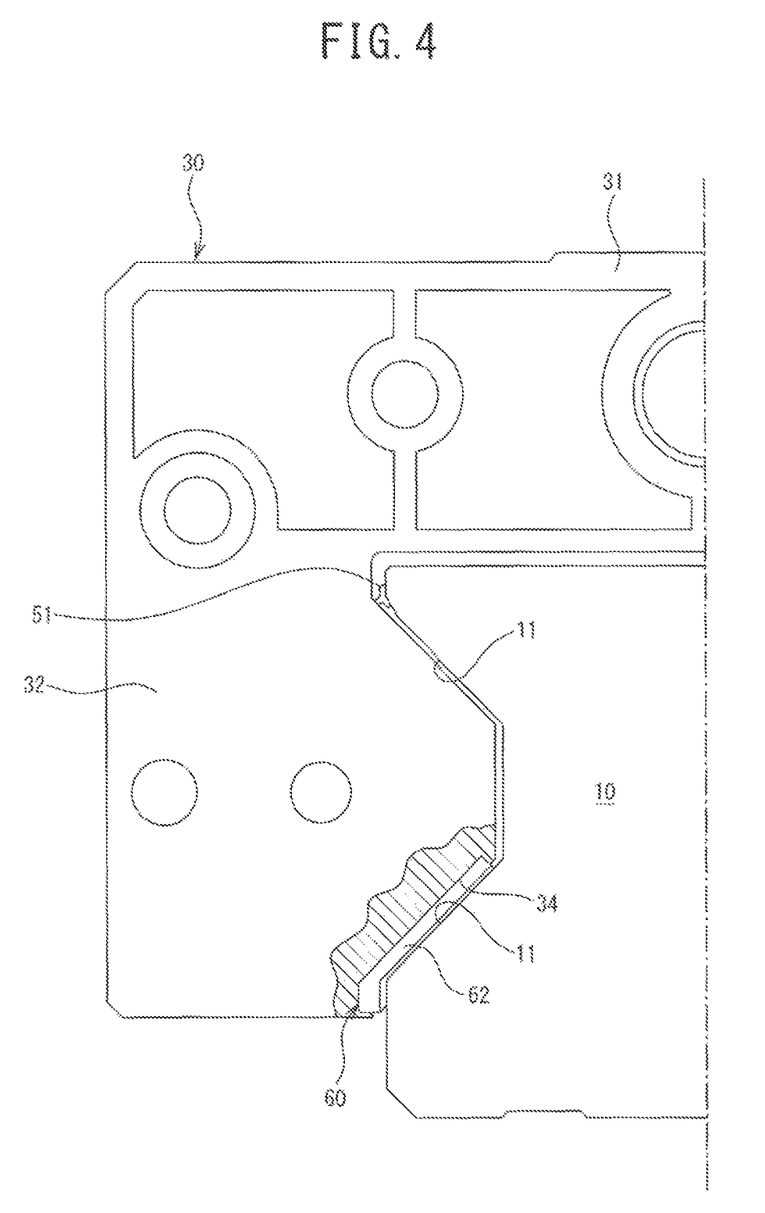
FIG. 4 is an enlarged front view, similar to FIG. 2, illustrating a state in which the auxiliary lip is attached.

As illustrated in FIGS. 4 and 5, this auxiliary lip 60 is attached to the surface, of the second arm portion 32 of the end cap 30, facing the guide rail 10. As illustrated in a perspective view of FIG. 3A as an example, the auxiliary lip 60 includes an axial direction lip 61 and an intersecting direction lip 62. The axial direction lip 61 on the surface, of the second arm portion 32, facing the guide rail 10 is disposed at a position lower than the under seal 50 (corresponding to "on a farther side from the second back portion" recited in claim 1), and extends along the under seal 50.

Figure 3B:
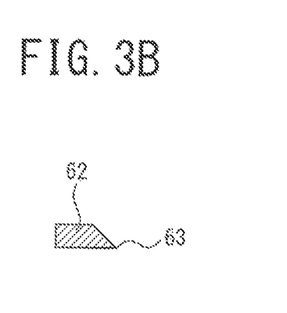
FIG. 3B is a cross-sectional view taken along the line A-A of FIG. 3A.
Figure 3C:
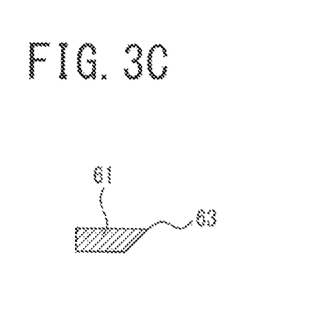
FIG. 3C is a cross-sectional view taken along the line B-B of FIG. 3A.

The intersecting direction lip 62 is integral with the axial direction lip 61. The intersecting direction lip 62 continuously extends in an upward direction from an end portion on the side seal 40 side of the axial direction lip 61, along an edge of the surface of the second arm portion 32, the edge being close to the side seal 40, the surface facing the guide rail 10. Here, the upward direction means a direction approaching the second back portion 31 among directions intersecting the axial direction. As a result, the auxiliary lip 60 has an approximate L shape as a whole.

This auxiliary lip 60 is made of the similar material as that of under seal 50 and the inner seal 51. The auxiliary lip 60 is fixed with one of the longitudinal sides fitted in a recessed groove 34 which is formed in the above-mentioned surface, of the second arm portion 32, facing the guide rail 10 and has approximately the same L shape as that of the auxiliary lip 60. The other side of the auxiliary lip 60 protrudes toward the guide rail 10, and is in sliding contact with the guide rail 10 with a suitable interference. A protruding end 63 of the auxiliary lip 60 tapers and has a wedge shape, so that, when the protruding end 63 is brought into sliding contact with the guide rail 10 over the entire length of the auxiliary lip 60, the protruding end 63 is deformed to be in close contact with the guide rail 10.

Figure 6:
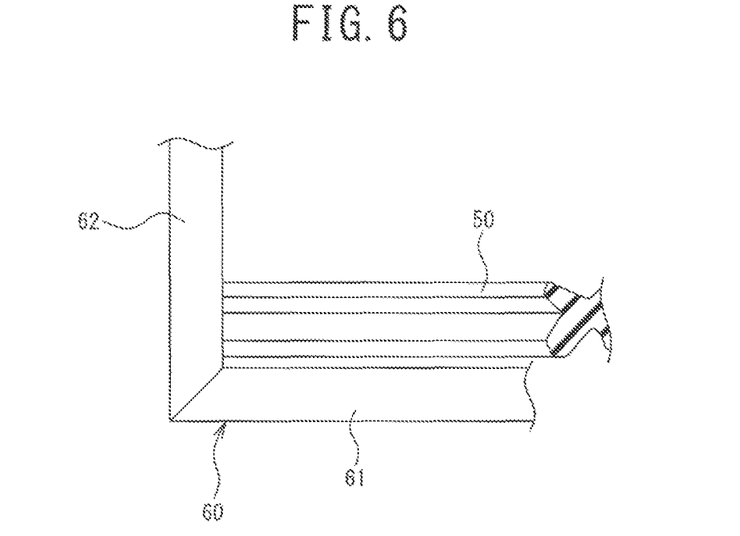
FIG. 6 is an enlarged view of a main part of FIG. 5, illustrating a contact state between the auxiliary lip and the under seal in the state of FIG. 5.
Figure 7:
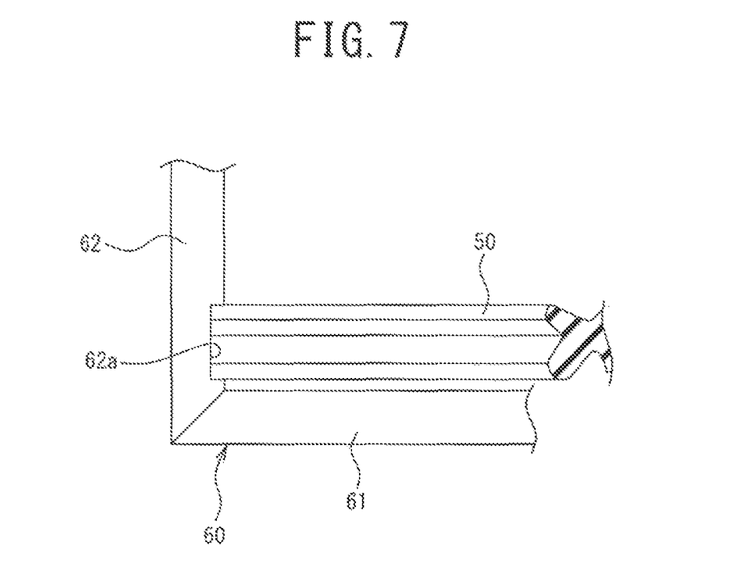
FIG. 7 is a view similar to FIG. 6, illustrating a contact state between the auxiliary lip and the under seal into which the state of FIG. 6 is changed.

As illustrated in an enlarged view of FIG. 6 in particular, the end portion of the under seal 50 abuts against the inner surface of the intersecting direction lip 62 of the auxiliary lip 60, that is, the surface facing the slider main body 20. Consequently, the intersecting direction lip 62 and the under seal 50 seal the inside from the outside between the guide rail 10 and the end cap 30. FIG. 7 shows an example in which a recessed portion 62a is formed in the intersecting direction lip 62 at a position in contact with the under seal 50, so that the end portion of the under seal 50 is fitted in the recessed portion 62a.

A lubricant such as a grease is sealed in the rolling element returning passages inside the slider main body 20. During traveling of the slider 100 relative to the guide rail 10, a number of rollers circulate in the load rolling passages, the direction changing passages 33, and the rolling element returning passages. At this time, the lubricant inside the slider main body 20 is transferred to the guide rail 10 through the rollers, and moved out of the slider 100.

In this linear guide apparatus, spaces between the arm portions 22, 32 of the slider main body 20 and the end caps 30, and the left and right side surfaces of the guide rail 10 are closed by the under seals 50, the inner seals 51, and the lip portions 43 of the side seals 40 on both sides in the axial direction and in the vertical direction. Consequently, the lubricant moved from the inside of the slider main body 20 to the guide rail 10 through the rollers remains in the inside surrounded by the seals 50, 51, and the lip portions 43.

In this embodiment in particular, as illustrated in FIG. 6, the end portion of the under seal 50 is covered by the auxiliary lip 60, and the end portion of the under seal 50 abuts against the intersecting direction lip 62 of the auxiliary lip 60. Thus, in a lower portion of the end cap 30, leakage of the lubricant is prevented by the under seal 50 and the intersecting direction lip 62. Further, on the side seal 40 side, the primary seal is provided by the intersecting direction lip 62, and the lubricant that has moved over the intersecting direction lip 62 is finally sealed by the intersecting direction lip 62 and the lip portion 43 of the side seal 40. In this embodiment, the intersecting direction lip 62 is formed to extend from the bottom of the second arm portion 32 to only approximately a third of the entire height of the second arm portion 32 of the end cap 30. However, when the lubricant leaks, a leakage occurs from a lower part of the arm portion 32 due to gravity, and therefore, the seal at the height of this level causes no problems at the primary stage.

In this respect, a prospected case is that, for example, deformation during traveling disturbs the state of the end portion of the under seal 50 abutting against the intersecting direction lip 62 of the auxiliary lip 60, so that the distal end of the under seal 50 moves apart from the intersecting direction lip 62. Even in such a case, however, since the end portion of the under seal 50 is covered by the axial direction lip 61 and the intersecting direction lip 62 of the auxiliary lip 60, downward leakage is prevented by the seal of the axial direction lip 61 of the auxiliary lip.

The axial direction lip 61 is disposed at a position lower than and close to the under seal 50, and a gap between the axial direction lip 61 and the under seal 50 is narrow. The intersecting direction lip 62 is disposed at a position inside and close to the lip portion 43 of the side seal 40, and a gap between the intersecting direction lip 62 and the lip portion 43 is also narrow. Consequently, the narrow, long gap between the axial direction lip 61 and the under seal 50 suppresses leakage of the lubricant to the outside from where the end portion of the under seal 50 abuts against the intersecting direction lip 62. Also, when the lubricant passes the primary seal and moves over an upper end of the intersecting direction lip 62, the narrow, long gap between the intersecting direction lip 62 and the lip portion 43 likewise suppresses leakage of the lubricant to the outside.

Thus, inside the second arm portion 32, leakage of the lubricant in the downward and axial directions is suppressed under a kind of the labyrinth effect of the narrow, long gaps. However, when these narrow, long gaps are closed, the lubricant is stopped from leaking from the gaps. That is, either the gap between the axial direction lip 61 and the under seal 50 or the gap between the intersecting direction lip 62 and the lip portion 43 of the side seal 40 is eliminated by increasing the widths of the under seal 50 and the lip portion 43. As a result, since the gaps from which the lubricant leaks are eliminated, leakage of the lubricant is prevented. It is possible to increase the widths of the under seal 50 and the lip portion 43 even when parts of the under seal 50 and the lip portion 43 that are attached to the end cap 30 and the side seal 40 have conventional widths. This is, it is necessary only to increase the widths of the parts of the under seal 50 and the lip portion 43 that protrude toward the guide rail 10 from the second arm portion 32 of the end cap 30 and the third arm portion 42 of the side seal 40, so that the protruding parts are brought into contact with the axial direction lip 61 and the intersecting direction lip 62.

FIG. 7 shows the example in which the recessed portion 62a is formed in the side surface of the intersecting direction lip 62, and the end portion of the under seal 50 is fitted in the recessed portion 62a. Consequently, the intersecting direction lip 62 and the under seal 50 are coupled tight, thus improving the sealability. Even when a leakage occurs here, a further labyrinth effect by the recessed/protruding fitted portions can be obtained advantageously.

Note that cross-sectional shapes of the auxiliary lip 60 and the under seal 50 are not limited to the shapes employed in this embodiment and illustrated in the drawings.

REFERENCE SIGNS LIST 10 guide rail
11 rail-side rolling element rolling groove
20 slider main body
21 first back portion
22 first arm portion
30 end cap
31 second back portion
32 second arm portion
33 direction changing passage
34 recessed groove
40 side seal
41 third back portion
42 third arm portion
43 lip portion
50 under seal
60 auxiliary lip
61 axial direction lip
62 intersecting direction lip
100 slider

The invention claimed is:

1. A seal mechanism of a linear guide apparatus, the linear guide apparatus comprising:

a guide rail including a rail-side rolling element rolling groove extending in an axial direction on each of both side surfaces of the guide rail;

a slider main body straddling on the guide rail to be capable of moving relatively, the slider main body including first arm portions at positions facing the both side surfaces of the guide rail, the first arm portions being integrally continuous through a first back portion facing another surface of the guide rail, each of the first arm portions including a slider-side rolling element rolling groove facing the rail-side rolling element rolling groove and an internal linear rolling element returning passage;

end caps coupled to both end surfaces of the slider main body in the axial direction, respectively, each of the end caps including second arm portions at positions facing the both side surfaces of the guide rail, the second arm portions being integrally continuous through a second back portion facing the another surface of the guide rail, each of the second arm portions including an arcuate direction changing passage communicating a linear load rolling passage with the rolling element returning passage, the load rolling passage being formed by the rail-side rolling element rolling groove and the slider-side rolling element rolling groove facing each other; and a plurality of rolling elements rollably loaded in a rolling element rolling passage formed by the load rolling passage, the rolling element returning passage, and the direction changing passage, the seal mechanism comprising:

side seals coupled to axially outer end surfaces of the end caps, respectively, each of the side seals including: third arm portions at positions facing the both side surfaces of the guide rail, the third arm portions being integrally continuous through a third back portion facing the another surface of the guide rail; and a lip portion on surfaces of the third back portion and the third arm portions, facing toward the guide rail, the lip portion being in sliding contact with the guide rail; and under seals extending in the axial direction, each of the under seals being attached on surfaces of the first arm portions and the second arm portions, facing toward the guide rail, the under seals being disposed on a farther side from the first back portion and the second back portion than the slider-side rolling element rolling groove and the direction changing passages, wherein the under seals and the side seals seal an inside from an outside, each of the end caps includes an auxiliary lip in sliding contact with the guide rail and bent in a middle of the auxiliary lip so as to cover an end portion of the under seal between the end cap and the guide rail from two directions including from the side seal side and from a far side from the second back portion, and the auxiliary lip includes:

an axial direction lip on a surface of the second arm portion, facing toward the guide rail, the axial direction lip being disposed on a farther side from the second back portion than the under seal to extend along the under seal; and an intersecting direction lip integrally formed with the axial direction lip so as to connect an end portion on the side seal side of the axial direction lip, the intersecting direction lip continuously extending in a direction intersecting she axial direction along an edge of the surface of the second arm portion, facing the guide rail, the edge being close to the side seal, the intersecting direction lip being in contact with the end portion of the under seal.

2. The seal mechanism of the linear guide apparatus according to claim 1, wherein a recessed portion is formed on a side surface of the intersecting direction lip of the auxiliary lip, and the end portion of the under seal is fitted in the recessed portion.

* * * * *